(12) United States Patent
Stevenson

(10) Patent No.: US 7,698,031 B2
(45) Date of Patent: Apr. 13, 2010

(54) ALGORITHM FOR EARLY DETECTION OF WHEEL MISALIGNMENT USING ON-VEHICLE INSTRUMENTATION

(75) Inventor: Robin Stevenson, Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1069 days.

(21) Appl. No.: 11/372,917

(22) Filed: Mar. 10, 2006

(65) Prior Publication Data

US 2007/0213893 A1    Sep. 13, 2007

(51) Int. Cl.
G01M 17/00 (2006.01)
G01L 3/26 (2006.01)
G06F 19/00 (2006.01)

(52) U.S. Cl. .............................. 701/29; 701/35; 701/41; 340/438

(58) Field of Classification Search ................... 701/29, 701/1, 33, 35, 36, 41; 73/116, 117.02; 280/727; 340/438
See application file for complete search history.

(56) References Cited

U.S. PATENT DOCUMENTS

| | | | | |
|---|---|---|---|---|
| 5,027,648 A | * | 7/1991 | Filleau | ..................... 73/117.02 |
| 5,029,466 A | * | 7/1991 | Nishihara et al. | ......... 73/117.02 |
| 5,795,997 A | * | 8/1998 | Gittins et al. | ............. 73/117.02 |
| 6,098,296 A | * | 8/2000 | Perisho et al. | ................. 33/203 |
| 6,208,240 B1 | * | 3/2001 | Ledesma | ..................... 340/438 |
| 6,275,753 B1 | * | 8/2001 | Kyrtsos | ....................... 701/36 |
| 6,574,539 B1 | | 6/2003 | Ashrafi | |
| 6,650,980 B2 | | 11/2003 | Ashrafi | |
| 2002/0059821 A1 | * | 5/2002 | Ashrafi et al. | ................. 73/116 |

* cited by examiner

*Primary Examiner*—Tan Q Nguyen
(74) *Attorney, Agent, or Firm*—John A. Miller; Miller IP Group, PLC

(57) ABSTRACT

A system and method for determining vehicle wheel misalignment. The method includes accumulating the hand-wheel position using a hand-wheel sensor over a predetermined sampling period, and then comparing the accumulated hand-wheel position to previously accumulated hand-wheel positions to provide an indication of wheel misalignment. Because a vehicle will typically be driven so that the right turns will substantially equal the left turns over a sufficiently large sampling period, the accumulated hand-wheel position should average out to be about zero, unless there is a wheel misalignment which would cause the vehicle operator to continuously turn the hand-wheel in one direction when driving straight. Therefore, if the accumulated hand-wheel position exhibits a consistent algebraic deviation and shows a progressive increase over multiple sampling periods, the confidence of wheel misalignment will increase.

20 Claims, 2 Drawing Sheets

ALGORITHM FOR EARLY DETECTION OF WHEEL MISALIGNMENT USING ON-VEHICLE INSTRUMENTATION

BACKGROUND OF THE INVENTION

1. Field of the Invention

This invention relates generally to a system and method for determining vehicle wheel misalignment and, more particularly, to a system and method for determining vehicle wheel misalignment that includes algebraically accumulating the hand-wheel position over a sampling period to determine if the averaged hand-wheel position is significantly turned.

2. Discussion of the Related Art

When a vehicle is manufactured, the orientation of the front wheels of the vehicle is calibrated to provide optimum steering performance and handling of the vehicle. However, various factors, such as wear and tear of the suspension components, age of the vehicle, impacts with, for example, pot holes and parking lot stops, etc., may cause the front wheels of the vehicle to become misaligned, which could affect steering performance and vehicle stability. An indicator typically used to determine wheel misalignment under straight-ahead driving conditions is whether the hand-wheel is centered. If a vehicle's front wheels are misaligned, the vehicle operator can overcome the misalignment by turning the hand-wheel enough so that the vehicle tracks in a straight ahead direction. Because vehicle misalignment has a potential impact on vehicle performance and stability, it is desirable that the vehicle operator be informed of the wheel misalignment so that the vehicle can be serviced and the alignment corrected.

For some wheel misalignment occurrences, such as a severe impact with a pothole, the wheel misalignment may be sufficiently dramatic so that the vehicle operator will immediately notice that the wheel misalignment has occurred and can have the vehicle serviced. However, most wheel misalignments are relatively minor, where it would not be noticed by the vehicle operator, but still could have significant affects on wheel wear and vehicle stability.

It is known in the art to determine vehicle wheel misalignment, and provide an indication to the vehicle operator of the misalignment. For example, U.S. Pat. Nos. 6,574,539 and 6,650,980, both titled Steering-Wheel Torque-Based Detection of Misalignment of a Vehicle Steering System, disclose such a system that makes use of torque measurements when a vehicle is driven straight to determine whether or not the wheels are misaligned. However, the wheel misalignment detection systems disclosed in these patents use fairly complicated processes. Simpler systems for providing wheel misalignment detection can be provided.

SUMMARY OF THE INVENTION

In accordance with the teachings of the present invention, a system and method are disclosed for determining vehicle wheel misalignment. The method includes sampling the orientation of the wheels, either directly or through a surrogate, such as the hand-wheel position using a hand-wheel sensor, algebraically accumulating these sampled data over a predetermined sampling period, and then comparing the accumulated position data to previously accumulated like data to provide an indication of wheel misalignment. Because a vehicle will typically be driven so that the right turns will substantially equal the left turns over a sufficiently large sampling period, the accumulated data should average out to about zero, unless there is a wheel misalignment that would require the vehicle operator to continuously orient the wheels of the vehicle to other than a straight-ahead position when driving straight. Therefore, if the algebraically accumulated data is of a consistent sign, i.e., either positive or negative, and shows increasing deviations from zero, the confidence of wheel misalignment will increase.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for determining vehicle wheel misalignment is merely exemplary in nature, and is in no way intended to limit the invention or its applications or uses.

Figure 1:
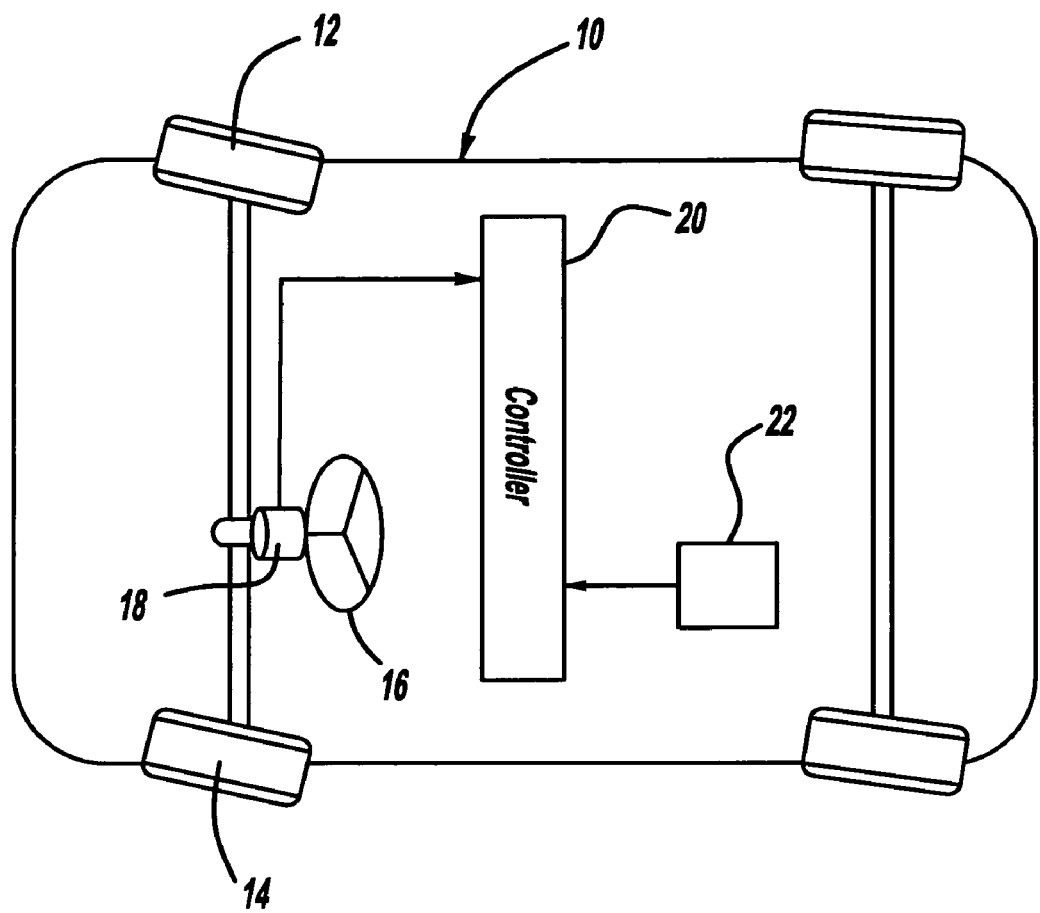
FIG. 1 is a plan view of a vehicle including a hand-wheel angle sensor and a controller for accumulating hand-wheel positions to determine wheel misalignment, according to an embodiment of the present invention.

FIG. 1 is a plan view of a vehicle 10 including front wheels 12 and 14 and a hand-wheel 16 used to steer the front wheels 12 and 14. A hand-wheel angle sensor 18 measures the rotation of the hand-wheel 16, and provides a signal indicative of the hand-wheel angle. The vehicle 10 also includes a controller 20 that receives the hand-wheel angle signal from the hand-wheel angle sensor 18, and provides a signal to an indicator light 22 indicative of the misalignment of the front wheels 12 and 14, according to an embodiment of the present invention.

As will be discussed in detail below, the controller 20 determines whether the front wheels 12 and 14 are misaligned by accumulating sampled values of the hand-wheel position over a predetermined sampling period, for example, a predetermined distance. The controller 20 detects progressive misalignment of the wheels 12 and 14 that will cause more subtle indications of vehicle performance and feel that may be overlooked or ignored by the vehicle operator until it is so severe that significant collateral deterioration in the tires mounted on the wheels 12 and 14 or to the vehicle suspension has occurred. The process includes computing the algebraic sum of sampled hand-wheel positions over a relatively long sampling period.

The discussion herein uses the hand-wheel position as an indication of wheel orientation. As will be appreciated by those skilled in the art, this is a convenient technique for inferring the vehicle wheel orientation, and is intended to be only an illustrative non-limiting technique. Those skilled in the art will readily recognize other ways of determining wheel orientation other than measuring the position of the vehicle hand-wheel that are within the scope of the present invention.

On a macro-scale, because most vehicle travel originates from one location, such as a home, and the vehicle returns to the same location, most vehicle in-coming journeys will be an inverse of the out-going journey, and thus all of the turns should average to about zero. Even minor deviations from a particular route can be overcome as a result of the time averaging period. Further, on a micro-scale, every action has an inverse. Particularly, a vehicle will veer left to pass and veer right to return to the travel lane. Also, a vehicle will merge onto a freeway from the left, and exit the freeway from the right.

If on average the vehicle turning is similar for every 100 mile period, then the results attained during initial vehicle usage can be used as a base-line and incremental changes in the base-line on a continued use basis can be used as an indicator of wheel misalignment. Further, because alignment problems should be dealt with promptly, but not necessarily immediately, there is no need to act on the basis of only one measurement period. Thus, several consecutive measurements indicating a stable or gradual increase in the positive or negative deviation from the steering trend could be interpreted as a potential wheel misalignment. Several consecutive sampling periods that show alternating positive and negative deviations could be interpreted as noise and ignored.

When a vehicle follows a fairly well prescribed path and substantially reverses that path within the sampling period, it may be assumed that large hand-wheel movements, for example, those normally employed in making 90° turns, will tend to cancel. However, there are situations where these conditions do not hold, for example, a traveling salesperson with a large or several territories, and extended vacation trip, etc., and thus averages accumulated under these circumstances might be biased. To avoid this problem, the analysis can be restricted to small hand-wheel movements, those typical of lane changes or minor steering corrections required to stay in lane, by low pass filtering the overall signal. Because the hand-wheel excursions will occur frequently and essentially randomly, even when the vehicle is traveling straight, no significant bias should be introduced into the average. When some critical deviation between measured and base-line results is observed, a signal can be used to alert the vehicle operator that a possible misalignment condition requiring service exists.

Figure 2:
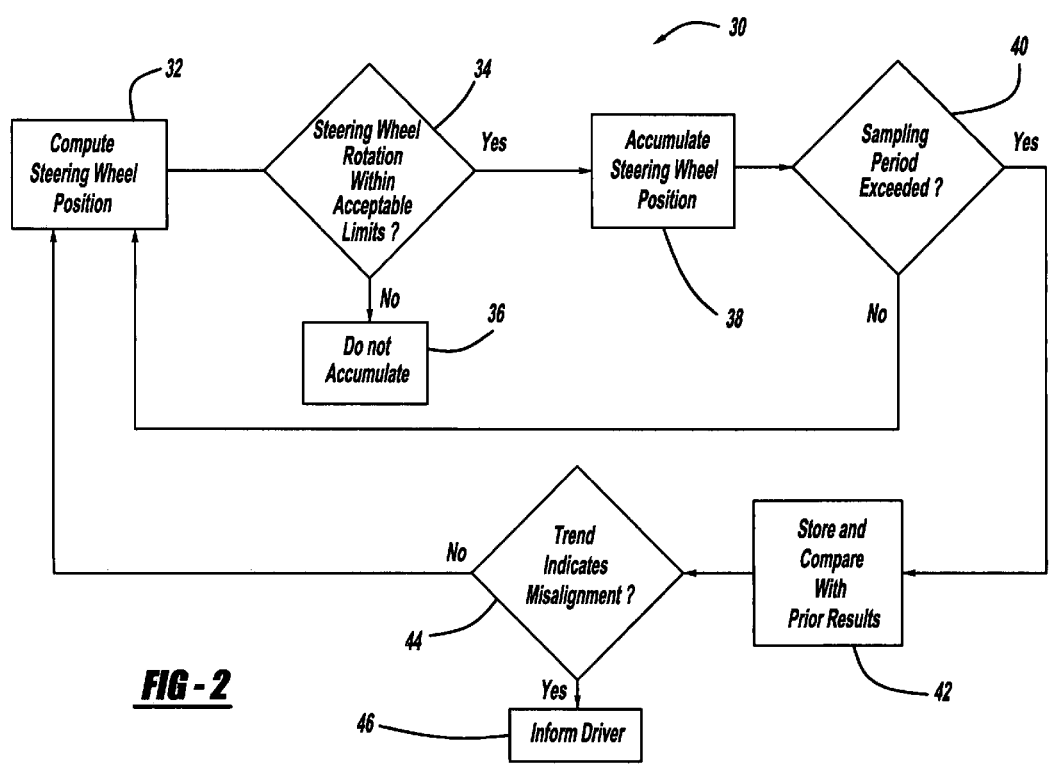
FIG. 2 is a flow chart diagram showing a process in the controller of FIG. 1 for algebraically accumulating hand-wheel position to determine wheel misalignment.

FIG. 2 is a flow chart diagram 30 showing an algorithm for determining wheel misalignment as discussed above. At box 32, the algorithm determines the hand-wheel position using the hand-wheel angle sensor 18. From the measured hand-wheel angle position, the algorithm determines whether the hand-wheel rotation is within acceptable limits at decision diamond 34. For those times when the hand-wheel is turned hard over, such as for backing up, turning around, parking, etc., the algorithm does not use those hand-wheel angle positions to determine wheel misalignment because they can skew the data. Therefore, if the hand-wheel position goes above a predetermined threshold, the algorithm will not accumulate the hand-wheel angle position at box 36.

If the hand-wheel angle position is within acceptable limits at the decision diamond 34, then the algorithm will accumulate or add the current hand-wheel position to an accumulated hand-wheel position within the current sampling period at box 38. The algorithm then determines if a predetermined sampling period has been exceeded at decision diamond 40, and if not, returns to the box 32 to continue measuring the hand-wheel angle position. The sampling period can be any suitable sampling period that gives effective results, such as 10-200 miles. The hand-wheel position can be sampled for any suitable sampling time, such as 1-100 seconds during the sampling period. Further, because the sampled values are not individually stored or retained, higher sampling frequencies may be employed without additional system modifications, if necessary, to ensure that a faithful record of the hand-wheel position is obtained without additional system modifications beyond that necessary to sample and process at the higher sampling rate.

If the sampling period has been exceeded at the decision diamond 40, then the algorithm stores and compares the accumulated hand-wheel angle position for that sampling period with prior accumulated hand-wheel angle positions that have been stored in the controller 20 for previous sampling periods at box 42. In order to determine whether there is an alignment problem with the front wheels 12 and 14, it is desirable to determine if the wheel misalignment is progressively getting worse. One sampling period may indicate that there is a slight accumulated hand-wheel angle to the right, and the next sampling period may indicate that there is a slight accumulated hand-wheel angle to the left, indicating that there is not a wheel misalignment problem. If the accumulated hand-wheel angle position continuously shows an accumulated hand-wheel angle position to one side, there may be a slight wheel misalignment, but not significant enough to require service. Even the factory settings of the wheel alignment will not be perfect. Also, if there is a significant hand-wheel angle accumulation in one direction for one sampling period, it may just be a fluke, and may not be an indication of a wheel misalignment problem. Therefore, the algorithm will compare the accumulated hand-wheel position with the hand-wheel position for several sampling periods. In one non-limiting embodiment, the comparison is made against five previous sampling periods.

The algorithm then determines whether the trend in accumulated hand-wheel positions indicates a misalignment at decision diamond 44. If the accumulated hand-wheel angle positions indicates a trend, either positive or negative, that is continually getting larger, a possible misalignment may be occurring. If that trend of progressively larger accumulations in one direction crosses a predetermined threshold, then the algorithm will provide an indicator warning at box 46, as discussed above. If not, then the algorithm returns to computing the hand-wheel position at box 32. In an alternate embodiment, the algorithm can determine that there is misalignment if the accumulated hand-wheel position has exceeded a predetermined threshold for a predetermined number of the sampling periods.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining wheel misalignment for wheels of a vehicle, said method comprising:
    measuring the position of a hand-wheel of the vehicle;
    sampling the measured hand-wheel position at a predetermined sampling time;
    accumulating the sampled hand-wheel positions during a predetermined sampling period;
    comparing the accumulated hand-wheel positions with previously accumulated hand-wheel positions from previous sampling periods; and
    determining whether there is a wheel misalignment based on the comparison.

2. The method according to claim 1 further comprising determining whether the sampled hand-wheel position is within a predetermined limit and only accumulating the sampled hand-wheel position if it is within the predetermined limit.

3. The method according to claim 2 wherein the predetermined limit is for relatively small wheel turns.

4. The method according to claim 1 wherein determining whether there is a wheel misalignment includes determining whether the accumulated hand-wheel position is getting increasingly larger over the sampling periods and has exceeded a predetermined threshold.

5. The method according to claim 1 wherein determining whether there is a wheel misalignment includes determining whether the accumulated hand-wheel position has exceeded a predetermined threshold for a predetermined number of sampling periods.

6. The method according to claim 1 wherein comparing the accumulated hand-wheel positions includes comparing the accumulated hand-wheel positions to five previous sampling periods.

7. The method according to claim 1 wherein the predetermined sampling period is about 10-200 miles.

8. The method according to claim 1 wherein the predetermined sampling time is about 1-100 seconds.

9. The method according to claim 1 wherein measuring the position of a hand-wheel of the vehicle includes using a hand-wheel angle sensor to measure the angle of the hand-wheel.

10. A system for determining whether a vehicle's wheels are misaligned, said system comprising:

a hand-wheel angle sensor for measuring the position of a vehicle hand-wheel and providing hand-wheel measurement signals;

a controller for determining if the wheels are misaligned based on the hand-wheel measurement signals, said controller sampling the hand-wheel measurement signal at a predetermined sampling time and accumulating the sampled hand-wheel measurements signals over a predetermined sampling period to provide a current accumulated hand-wheel position, said controller comparing the current accumulated hand-wheel position with previously accumulated hand-wheel positions from previous sampling periods, and said controller determining whether there is a wheel misalignment based on the comparison, said controller providing an output signal if it determines there is a wheel misalignment; and an indicator device responsive to the output signal for providing a signal indicating wheel misalignment.

11. The system according to claim 10 wherein the controller further determines whether the sampled hand-wheel measurement signals are within acceptable limits before the sampled measurement signal is accumulated.

12. The system according to claim 10 wherein the controller determines wheel misalignment by determining whether the accumulated hand-wheel angle position is increasingly getting larger and has exceeded a predetermined threshold.

13. The system according to claim 10 wherein the controller determines wheel misalignment by determining whether the accumulated hand-wheel position has exceeded a predetermined threshold for a predetermined number of sampling periods.

14. The system according to claim 10 wherein the controller compares the accumulated hand-wheel positions to five previous sampling periods.

15. The system according to claim 10 wherein the predetermined sampling period is about 10-200 miles.

16. The system according to claim 10 wherein the controller samples the hand-wheel measurement signal about 1-100 seconds.

17. The system according to claim 10 wherein the indicator device is a light.

18. A system for determining whether a vehicle's wheels are misaligned, said system comprising:

a sensor for measuring the angle of the vehicle's wheels and providing wheel angle signals;

a controller for determining if the wheels are misaligned based on the wheel angle signals, said controller accumulating the wheel angle signals over a predetermined sampling period to provide a current accumulated wheel angle, said controller comparing the current accumulated wheel angle with previously accumulated wheel angles from previous sampling periods, and said controller determining whether there is a wheel misalignment based on the comparison.

19. The system according to claim 18 wherein the controller further determines whether the wheel angle signals are within acceptable limits before the wheel angle signal is accumulated.

20. The system according to claim 18 wherein the controller determines wheel misalignment by determining whether the accumulated wheel angle is increasingly getting larger and has exceeded a predetermined threshold.

* * * * *